United States Patent
Young

(10) Patent No.: US 6,913,552 B2
(45) Date of Patent: Jul. 5, 2005

(54) SNAP-FIT CHAIN GUIDE WITH SAW-TOOTH FIXING FEATURE

(75) Inventor: James D. Young, Chesaning, MI (US)

(73) Assignee: Cloyes Gear and Products, Inc., Mentor, OH (US)

( * ) Notice: Subject to any disclaimer, the term of this patent is extended or adjusted under 35 U.S.C. 154(b) by 0 days.

(21) Appl. No.: 10/349,679

(22) Filed: Jan. 23, 2003

(65) Prior Publication Data

US 2003/0158008 A1 Aug. 21, 2003

Related U.S. Application Data

(60) Provisional application No. 60/351,436, filed on Jan. 23, 2002.

(51) Int. Cl.$^7$ .............................. F16H 7/08; F16H 7/18
(52) U.S. Cl. ...................................... 474/111; 474/140
(58) Field of Search .............................. 474/101, 109, 474/110–111, 140

(56) References Cited

U.S. PATENT DOCUMENTS

| | | |
|---|---|---|
| 3,346,126 A | 10/1967 | Bloom |
| 3,490,302 A | 1/1970 | Turner |
| 4,826,468 A | 5/1989 | Friedrichs |
| 4,832,664 A | 5/1989 | Groger et al. |
| 4,869,708 A | 9/1989 | Hoffmann et al. |
| 5,005,304 A | 4/1991 | Briscoe et al. |
| 5,045,032 A | 9/1991 | Suzuki et al. |
| 5,088,966 A | 2/1992 | Suzuki et al. |
| 5,184,982 A | 2/1993 | Shimaya et al. |
| 5,184,983 A | 2/1993 | Shimaya et al. |
| 5,193,244 A | 3/1993 | Meyers |
| 5,222,917 A | 6/1993 | Shimaya et al. |
| 5,318,482 A | 6/1994 | Sato et al. |
| 5,820,502 A | 10/1998 | Schulze |
| 5,984,815 A * | 11/1999 | Baddaria ...................... 474/111 |
| 6,013,000 A | 1/2000 | Moretz |
| 6,238,311 B1 * | 5/2001 | Cutting ....................... 474/111 |
| 6,322,470 B1 | 11/2001 | Markley et al. |
| 6,322,471 B1 | 11/2001 | Hashimoto |
| 6,572,502 B1 * | 6/2003 | Young et al. ................ 474/111 |
| 6,620,067 B1 * | 9/2003 | Nakamura et al. ........... 474/111 |
| 6,623,391 B2 * | 9/2003 | Young et al. ................ 474/111 |

FOREIGN PATENT DOCUMENTS

| | | | |
|---|---|---|---|
| DE | 30 49 106 | 7/1982 | |
| DE | 197 28 675 | 1/1998 | |
| DE | 100 10 335 A1 | 10/2000 | |
| DE | 199 51 393 A1 | 5/2001 | |
| EP | 1 096 173 A2 | 5/2001 | |
| FR | 75 20334 | 1/1976 | |
| JP | 2000-97042 A * | 4/2000 | ............. F16H/7/08 |
| JP | 2000-257679 A * | 9/2000 | ............. F16H/7/08 |
| JP | 2001108031 | 4/2001 | |
| JP | 2001311457 | 11/2001 | |

* cited by examiner

*Primary Examiner*—Marcus Charles
(74) *Attorney, Agent, or Firm*—Fay, Sharpe, Fagan, Minnich & McKee, LLP

(57) ABSTRACT

A chain guide includes a bracket adapted for being secured to an engine. The bracket includes a support surface including a leading end and a trailing end, and further includes a first saw-tooth fixing element. A guide shoe includes: (i) a shoe leading end; (ii) a shoe trailing end spaced from the shoe leading end in a chain movement direction; (iii) a chain guide surface extending between the shoe leading end and the shoe trailing end and adapted for slidably supporting an associated chain moving in the chain movement direction; and, (iv) an inner surface positioned adjacent the support surface of the bracket. The guide shoe further includes a second saw-tooth fixing element that mates with the first saw-tooth fixing element of the bracket to inhibit disconnection of said the guide shoe and the bracket.

20 Claims, 6 Drawing Sheets

SNAP-FIT CHAIN GUIDE WITH SAW-TOOTH FIXING FEATURE

CROSS-REFERENCE TO RELATED APPLICATION

This application claims priority from and benefit of the filing date of U.S. provisional application Ser. No. 60/351,436 filed Jan. 23, 2002.

BACKGROUND OF THE INVENTION

The present invention relates generally to the automotive chain drive art and, more particularly, to a snap-fit chain guide with locking connector arrangement. In particular, the present invention relates to a novel and unobvious snap-fit chain guide shoe that securely and slidably interconnects with a support bracket in a manner that is easy to install, durable and inexpensive.

Chain guides, which for purposes of this document include chain tensioner arms and fixed chain guides, are well known. In a typical arrangement, a guide blade or guide shoe made of a plastic or other low-friction material is fixedly secured to an underlying support bracket that is, itself, manufactured from metal or a filled plastic material. A wide variety of structures and methods are known for operatively interconnecting a plastic guide shoe to an associated bracket.

One prior method of connecting a plastic guide shoe to a support bracket requires use of an adhesive and/or mechanical fasteners. These methods increase assembly time and costs. Also, the plastic shoe can separate from the bracket. In another known arrangement, the plastic shoe is molded directly over the support structure of the bracket. This approach is also expensive.

Prior arrangements are known for releasably fitting a plastic shoe to a bracket. One example is found in U.S. Pat. No. 5,820,502. In this patent, a plastic shoe or lining B is secured to a carrier T with a pivoting snap-fit. However, the disclosed arrangement is limited to an I-beam type bracket or carrier T. Furthermore, the arrangement disclosed in the U.S. Pat No. 5,820,502 is not a sliding snap-fit arrangement and, instead, requires that the plastic shoe be pivoted or twisted into its operative position. As such, assembly is difficult and shoe stress during assembly is increased. Secondly, the required pivoting action limits the different bracket configurations that can be employed, increases the space required for assembly and also increases the risk of improper and incomplete assembly.

In light of the foregoing, it has been deemed desirable to provide a snap-fit chain guide with locking connector arrangement that overcomes the foregoing specifically noted deficiencies and others while providing better overall results.

SUMMARY OF THE INVENTION

In accordance with the present invention, a chain guide includes a bracket adapted for being secured to an engine. The bracket includes a support surface including a leading end and a trailing end, and further includes a first saw-tooth fixing element. A guide shoe includes: (i) a shoe leading end; (ii) a shoe trailing end spaced from the shoe leading end in a chain movement direction; (iii) a chain guide surface extending between the shoe leading end and the shoe trailing end and adapted for slidably supporting an associated chain moving in the chain movement direction; and, (iv) an inner surface positioned adjacent the support surface of said bracket. The guide shoe further includes a second saw-tooth fixing element that mates with the first saw-tooth fixing element of said bracket to inhibit disconnection of said guide shoe and said bracket.

In accordance with another aspect of the present invention, a chain guide includes a bracket adapted for being secured to an associated engine. The bracket comprising a support, a bracket leading end and a bracket trailing end spaced from the leading end in a chain movement direction. The bracket further includes a first saw-tooth fixing element defined by a plurality of teeth that extend in the chain movement direction and that are raked in the chain movement direction. A plastic guide shoe includes a shoe leading end, a shoe trailing end, a chain guide surface adapted for slidably supporting an associated chain moving in the chain movement direction, and an inner surface positioned adjacent the support of the bracket. The shoe is selectively movable slidably relative to the support of the bracket between a first position where the guide shoe is separable from said bracket and a second position where the guide shoe is fixedly secured to the bracket. The guide shoe includes: (i) a portion defined at the shoe leading end that that engages a portion of the bracket when the shoe is located in the second position; and, (ii) a second saw-tooth fixing element that mates with the first saw-tooth fixing element when the guide shoe is located in the second position. The second saw-tooth fixing element is defined by a plurality of teeth that extend in the chain movement direction and that are raked in a direction opposite the chain movement direction.

One advantage of the present invention resides in the provision of a new and improved snap-fit chain guide with a saw-tooth fixing feature.

Another advantage of the present invention resides in the provision of a snap-fit chain guide having a saw-tooth fixing feature wherein the shoe is slidably rather than pivotably snap-fit into its operative position.

A further advantage of the present invention resides in the provision of a snap-fit chain guide that exhibits improved connection of the shoe to the bracket and that is resistant to undesired movement in a direction opposite the chain travel direction and/or in a direction transverse to the chain travel direction.

Still another advantage of the present invention resides in the provision of a snap-fit chain guide that is snap-fit into position by moving the plastic shoe in a direction that corresponds to the chain travel direction whereby chain movement cannot dislodge the shoe from the bracket owing to the saw-tooth fixing feature.

Other benefits and advantages of the present invention will become apparent to those of ordinary skill in the art to which the invention pertains upon reading this specification.

BRIEF DESCRIPTION OF THE DRAWINGS

The invention comprises various components and arrangements of components, preferred embodiments of which are illustrated herein and wherein.

DETAILED DESCRIPTION OF PREFERRED EMBODIMENTS

Figure 1:
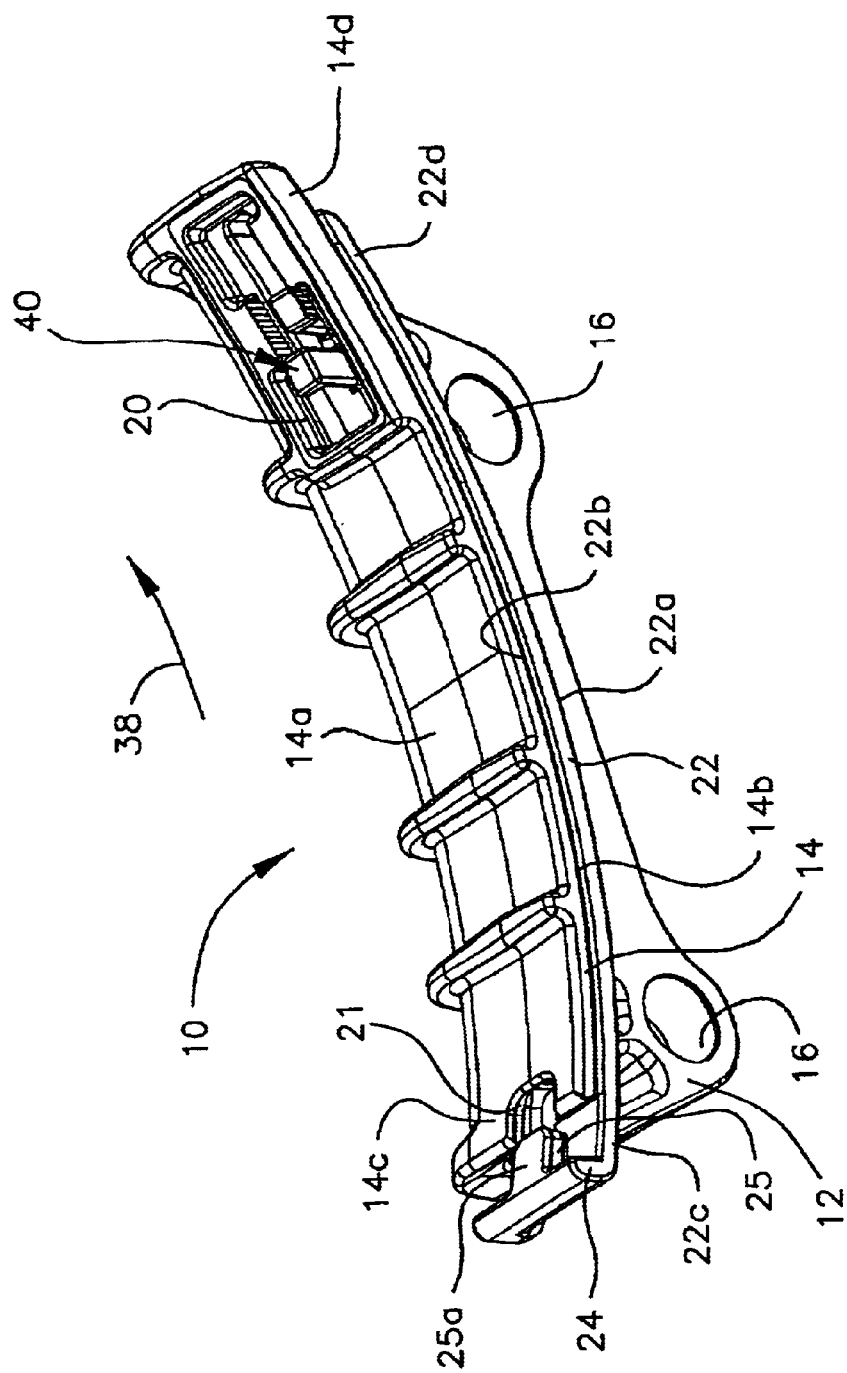
FIG. 1 is an isometric view of snap-fit chain guide formed in accordance with the present invention, with a plastic shoe portion thereof including a saw-tooth fixing feature and being partially installed on a bracket portion thereof.

FIGS. 1–4 illustrate a chain guide assembly 10 formed in accordance with the present invention. The chain guide assembly 10 comprises an L-shaped bracket 12 having a flange 14 projecting therefrom. The bracket 12 is typically defined as a one-piece metal stamping or casting, or as a molded plastic or composite part. One or more mounting holes 16 are defined through the bracket and receive bolts or other fasteners for fixedly securing the bracket to an engine block or other support structure.

The flange 14 includes an rear or inoperative surface 14a, a shoe support surface 14b located opposite the rear surface, a leading end 14c and a trailing end 14d, wherein the leading end 14c is located upstream from the trailing end 14d during use relative to a chain movement direction 38. The shoe support surface 14b is typically curved or arcuate as shown.

In the illustrated embodiment, the flange 14 defines a keyhole aperture 20 adjacent its trailing end 14d, i.e., the keyhole aperture 20 is located closer to the trailing end 14d than it is to the leading end 14c. In general, however, it is preferred that the keyhole aperture 20 be as closed to the leading end 14c as possible for a given application and envelope. The leading end 14c defines a notch 21.

A guide shoe 22, preferably defined from a molded plastic material or any other suitable low-friction material, is releasably mounted to the bracket 12 adjacent the flange 14. The term "plastic" is intended to include all materials that comprise a polymeric component and can include composite and other materials without departing from the overall scope and intent of the invention. The shoe 22 comprises an outer face 22a, an inner face 22b, a leading end 22c and a trailing end 22d. As shown in FIG. 1A, when the shoe 22 is operatively connected to the bracket 12, the shoe 22 conforms to the general shape of the shoe support surface 14b of the flange 14, with the inner face 22b of the shoe 22 located adjacent the shoe support surface 14b. In this operative position, the outer face 22a of the shoe is exposed and adapted to support a sliding chain thereon, with the chain moving in a chain movement direction indicated by the arrow 38 from the leading end 14c of the shoe toward the trailing end 14d of the shoe 22.

The shoe 22 is releasably yet securely fixed to the bracket 12 when operatively positioned (FIG. 1A). The leading end 22c of the shoe 22 is conformed and dimensioned to engage the leading end 14c of the flange 14. More particularly, as may be seen most clearly with reference to FIG. 1, the leading end 22c of the shoe defines a curved portion 24 that engages the leading end 14c of the flange 14. Furthermore, the leading end 22c of the shoe includes a rib 25 that is conformed and dimensioned for close sliding receipt in the notch 21 defined at the leading end 14c of the flange when the shoe 22 is moved slidably in the direction of chain movement 38 to its operative position as shown in FIG. 1A. The rib 25 is T-shaped and includes a projecting lip 25a or is otherwise conformed to engage the notch at the leading end 14c of the bracket when the shoe 22 is located in its second (operative) position (FIG. 1A) so as to prevent lifting movement of the inner surface 22b of the shoe away from the shoe support surface 14b.

Figure 1A:
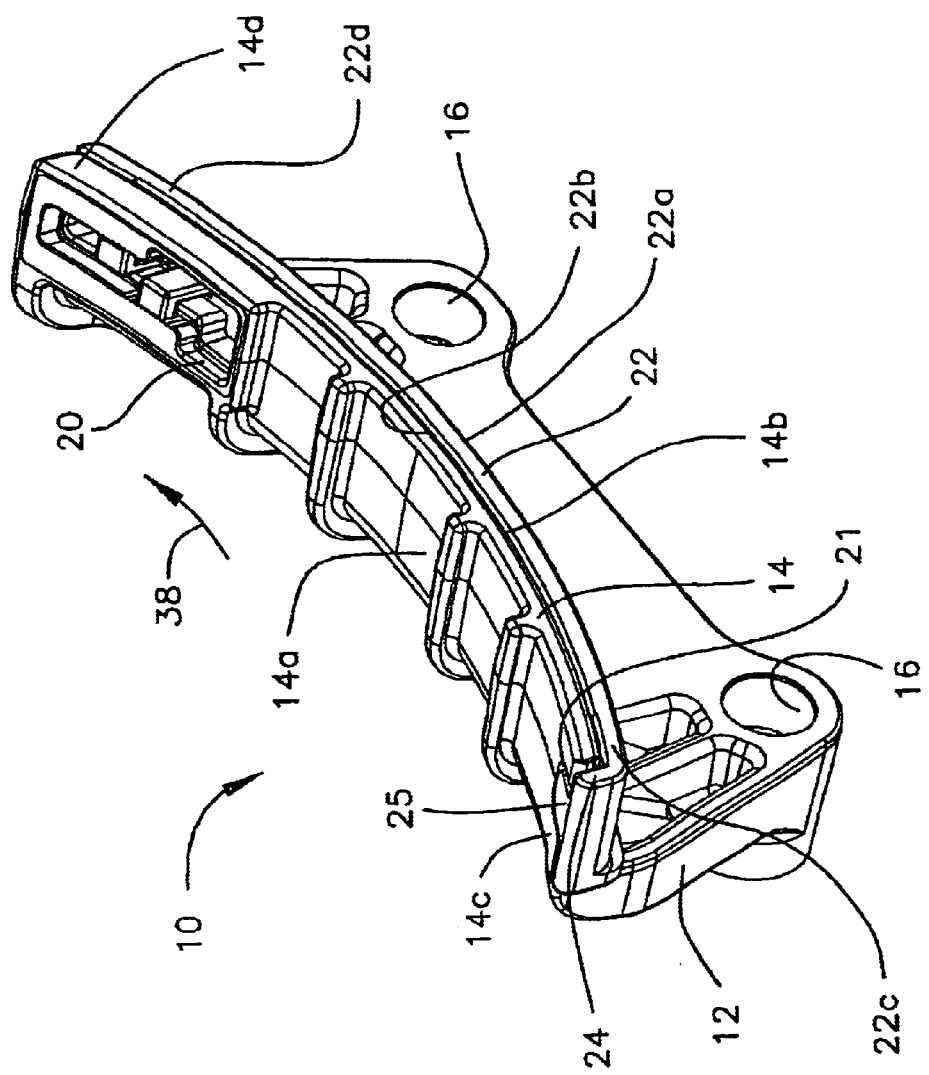
FIG. 1A shows the snap-fit chain guide of FIG. 1 with the plastic shoe portion fully and operatively installed on the bracket portion.
Figure 1B:
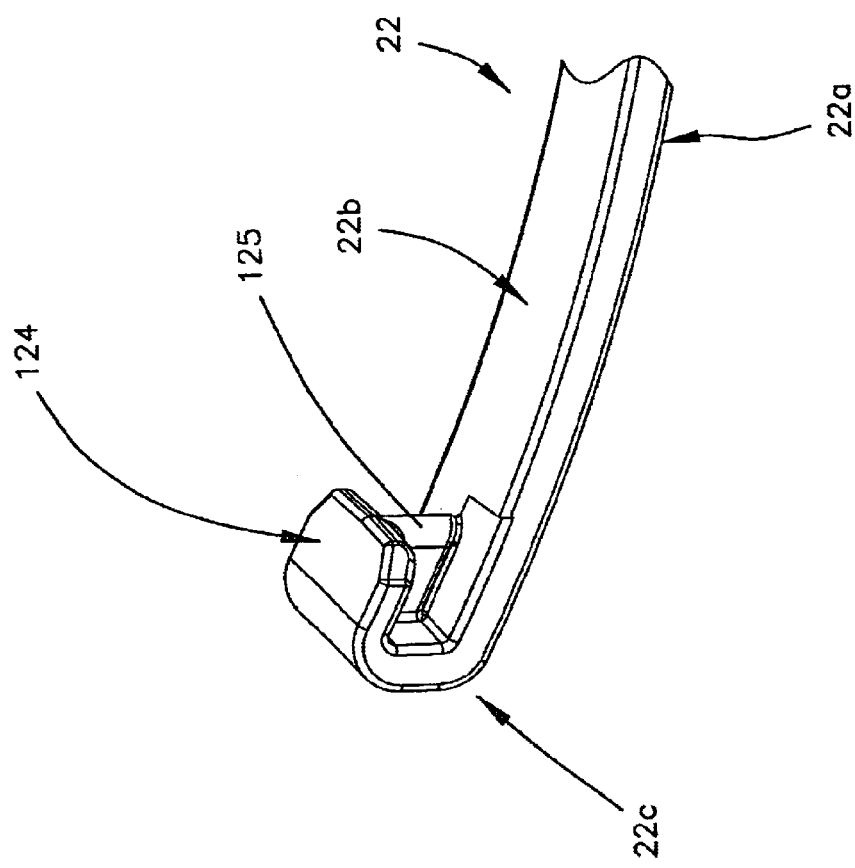
FIG. 1B shows an alternative formation for the leading end of the plastic guide shoe.

As shown in FIG. 1B, the leading end 22c of the shoe 22 can be formed to include a more pronounced hooked portion 124 that slidably receives and wraps more completely around the leading end 14c of the bracket 14 to provide additional assurance against lifting of the shoe 22 away from the leading end 14c of the bracket. The rib 125 is closely slidably received in the notch 21 as with the rib 25 discussed above.

Figure 2:
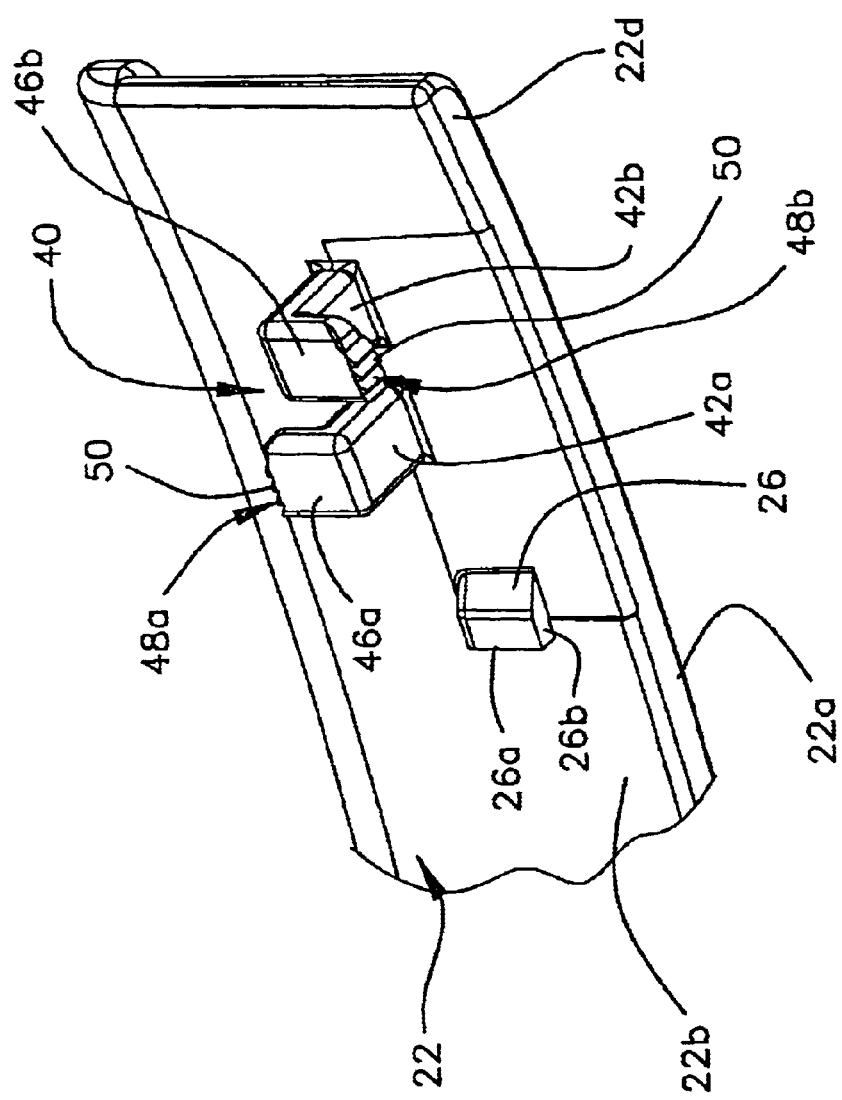
FIG. 2 is a greatly enlarged partial isometric illustration of a plastic shoe portion of the chain guide shown in FIGS. 1 and 1A.

A male connector 40, best seen in FIGS. 1 and 2, projects outwardly from the inner surface 22b of the shoe 22. The male connector 40 is located based upon the location of keyhole 20 and, in general, is preferably located as close to the leading end 22c as possible. The illustrated male connector 40 comprises first and second L-shaped legs. The first L-shaped leg of the male connector 40 is defined by an outwardly projecting leg portion 42a and a transverse foot portion 46a connected to the leg portion 42a; the second L-shaped leg of the male connector 40 is defined by an outwardly projecting leg portion 42b and a transverse foot portion 46b connected to the leg portion 42b. The foot portions 46a,46b extend outwardly away from each other in opposite directions.

The foot portions 46a,46b respectively define saw-tooth outer faces 48a,48b that include or define a plurality of teeth 50. Each saw-tooth face 48a,48b extends generally in the chain movement direction 38. For reasons that will become readily apparent below, the teeth 50 defining each saw-tooth face 48a,48b are sloped or raked toward the leading end 22c of the shoe. The first and second legs 42a,42b of the male connector 40 are offset from each other in the chain movement direction 38 to facilitate injection molding of the shoe 22 and so that each leg can flex independently of the other in directions transverse to the chain movement direction.

A supplemental locking nib or projection 26 (FIG. 2) projects outwardly away from the inner surface 22b of the shoe 22 adjacent the male connector 40, generally between the male connector 40 and the leading end 22c of the shoe. This supplemental locking nib 26 includes first and second stop surfaces 26a,26b, the function of which will be described below.

Figure 3:
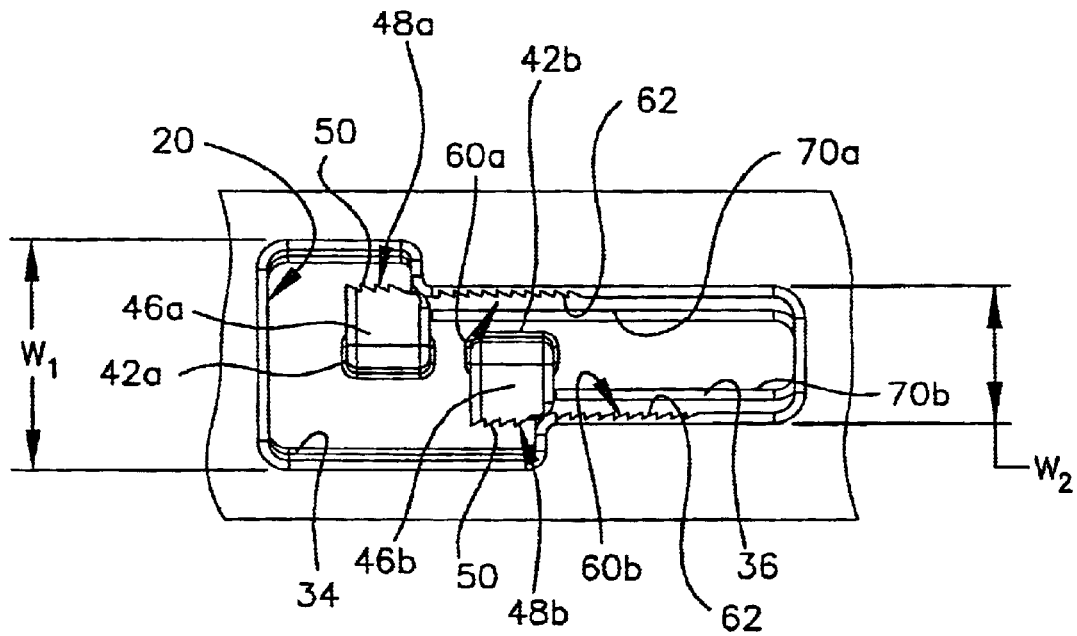
FIG. 3 is a partial plan view that illustrates a saw-tooth fixing feature of the chain guide shown in FIG. 1 and that shows the plastic guide shoe in a first inoperative or partially installed position (corresponding to FIG. 1)
Figure 4:
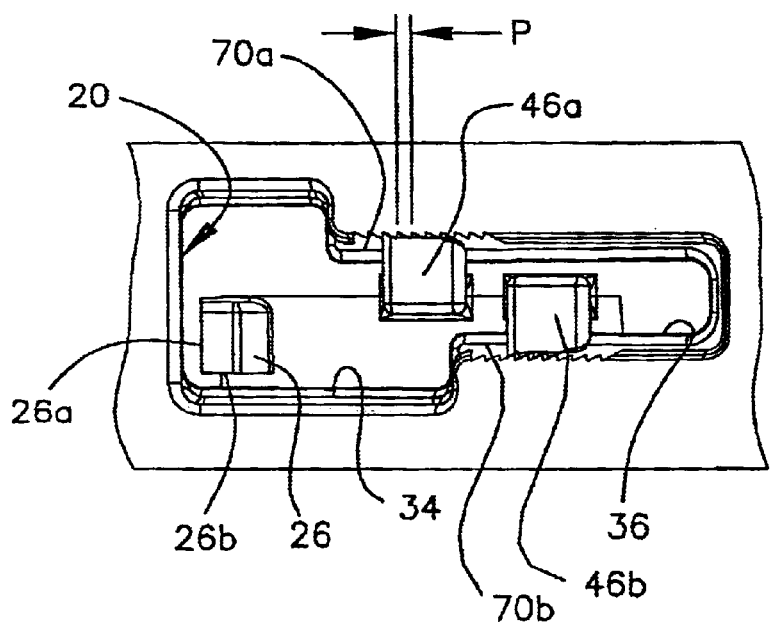
FIG. 4 is a plan view that is similar to the view of FIG. 3 but that shows the plastic guide shoe in a second, fully-installed operative position (corresponding to FIG. 1A); and, FIG. 5 is similar to FIG. 4 but shows an alternative embodiment wherein the guide shoe includes a supplemental projection for lateral stability.

With reference now also to FIGS. 3 and 4, the keyhole aperture 20 includes an enlarged upstream portion 34 and a restricted downstream portion 36. The enlarged portion 34 defines a first width $W_1$ and the restricted portion 36 defines a second width $W_2$ that is less than the width $W_1$. The keyhole 20 is also defined to include first and second separate saw-tooth faces 60a,60b each defined by a plurality of teeth 62. These saw-tooth faces 60a,60b cooperate to define a "first saw-tooth fixing element," and the separate faces 48a,48b of the male connector 40 cooperate to define a "second saw-tooth fixing element." As such, the bracket 12 comprises a first saw-tooth fixing element 60a,60b and the plastic shoe 22 comprises a second saw-tooth fixing element 48a,48b.

The first and second saw-tooth faces 60a,60b extend in the direction of chain movement 38 and are preferably parallel to and arranged in an opposed facing relationship with the first and second saw-tooth faces 48a,48b, respectively. Furthermore, the teeth 62 defining the first and second saw-tooth faces 60a,60b are dimensioned and arranged to engage the teeth 50 of the saw-tooth faces 48a,48b and, thus, the teeth 62 are sloped or raked in a direction to mate with the teeth 50, i.e., toward the trailing end 14d of the bracket flange 14.

It is also preferred, as shown, that the saw-tooth surfaces 60a,60b of the keyhole 20 extend for a longer distance in the chain movement direction 38 as compared to the faces 48a,48b. Furthermore, owing to the offset of the first and second legs of the male connector 40, it is preferred that the saw-tooth faces 60a,60b be correspondingly offset relative to each other as shown.

The keyhole aperture 20 also defines first and second shoulders 70a,70b respectively adjacent the saw-tooth faces 60a,60b that are approximately parallel to the shoe support surface 14b of the flange. As described below, these shoulders 70a,70b are engaged by the feet 46a,46b to prevent lifting of the shoe 22 away from the flange 14 at the trailing end 22d when the shoe 22 is in its second (operative) position.

To secure the plastic shoe 22 operatively to the flange 14, the shoe is positioned as shown in FIGS. 1 and 3, with the inner surface 22b thereof located adjacent the shoe support surface 14b of the flange 14 and the male connector 40 projecting through the enlarged portion 34 of the keyhole aperture 20. The shoe 22 is then moved slidably in the chain movement direction 38 to the position as shown in FIG. 1A. This sliding movement of the shoe 22 causes the male connector 40 to move from the enlarged portion 34 of the keyhole aperture 20 into the reduced portion 36 as shown in FIG. 4.

With continuing reference to FIGS. 3 and 4, as saw-tooth faces 48a,48b of the male connector 40 slidably encounter the mating saw-tooth faces 60a,60b of the keyhole aperture 20, they are deflected inwardly toward each other and slide over the saw-tooth faces 60a,60b, respectively, in a ratchet-like manner.

When the leading end 22c of the shoe 22 fully engages the leading end 14c of the bracket flange 14, the shoe 22 is prevented from further sliding movement in the chain travel direction 38. Due to the resilience of the legs 42a,42b, the saw-tooth faces 48a,48b are urged into and resiliently maintained in firm engagement with the saw-tooth faces 60a,60b, respectively. Furthermore, because the teeth 50 are raked in a direction opposite that of the teeth 62, the shoe 22 is prevented (under all expected operating conditions) from moving slidably in a direction opposite the chain travel direction 38 once the saw-tooth faces 48a,48b are engaged with the saw-tooth faces 60a,60b, i.e., once the first and second saw-tooth fixing elements are mated. It should also be noted that, even when the saw-tooth faces 48a,48b are fully engaged or meshed with their respective mating saw-tooth faces 60a,60b, the legs 42a,42b are still resiliently deflected inwardly from their free or relaxed positions so that the faces 48a,48b are urged into engagement with the respective mating faces 60a,60b at all times.

In the preferred embodiment as illustrated, the teeth 50 of face 48a are nominally offset relative to teeth 50 of other face 48b in the chain movement direction 38 by a distance P/n where P=the pitch (spacing) of the teeth 50 on faces 48a,48b as shown in FIG. 4; and wherein n=the number of separate saw-tooth faces 48a,48b that cooperate to define the second saw-tooth fixing element. As shown, the second saw tooth fixing element is defined by two separate faces 48a, 48b and, thus, n=2 and the offset or "stagger" between the separate faces 48a,48b is P/2. As an alternative, the teeth 50 of the faces 48a,48b can be aligned with each other (no pitch offset) and the offset is then introduced into the teeth 62 of the faces 60a,60b according to the same formula where P=the pitch (spacing) of the teeth 62 on faces 60a,60b and n=the number of separate saw-tooth faces 60a,60b that cooperate to define the first saw-tooth fixing element. As shown, the first saw tooth fixing element is defined by two separate faces 60a,60b and, thus, n=2 and the offset would be P/2. This nominal arrangement helps to ensure that, in practice, the shoe 22 will move upstream against the chain travel direction 38 no more than the distance P/n, e.g., half of the pitch P in the present example.

It is also apparent with reference to FIG. 4 that the feet 46a,46b of the male connector 40 respectively overhang the shoulders 70a,70b when the shoe 22 is fully operatively connected to the flange 14 of the bracket 12. In this manner, the feet 46a,46b prevent the shoe inner surface 22b, at the trailing end 22d, from lifting away from the shoe support surface 24b of the flange 14.

When the shoe 22 is fully and operatively installed as shown in FIGS. 1A and 4, the supplemental locking projection 26 extends into the keyhole aperture 20. In this position, the first stop surface 26a of the supplemental locking projection 26 will engage the periphery of the keyhole aperture 20 upon more than minimal movement of the shoe 22 toward the leading end 14c of the flange to prevent further undesired movement of the shoe 22 in this direction. Furthermore, when the shoe 22 is operatively positioned, the second stop surface 26b of the supplemental locking projection 26 will engage the periphery of the keyhole aperture 20 upon more than minimal movement of the shoe 22 in a transverse direction to prevent this undesired movement. The supplemental locking projection 26 is a redundant locking feature and is optional.

Figure 5:
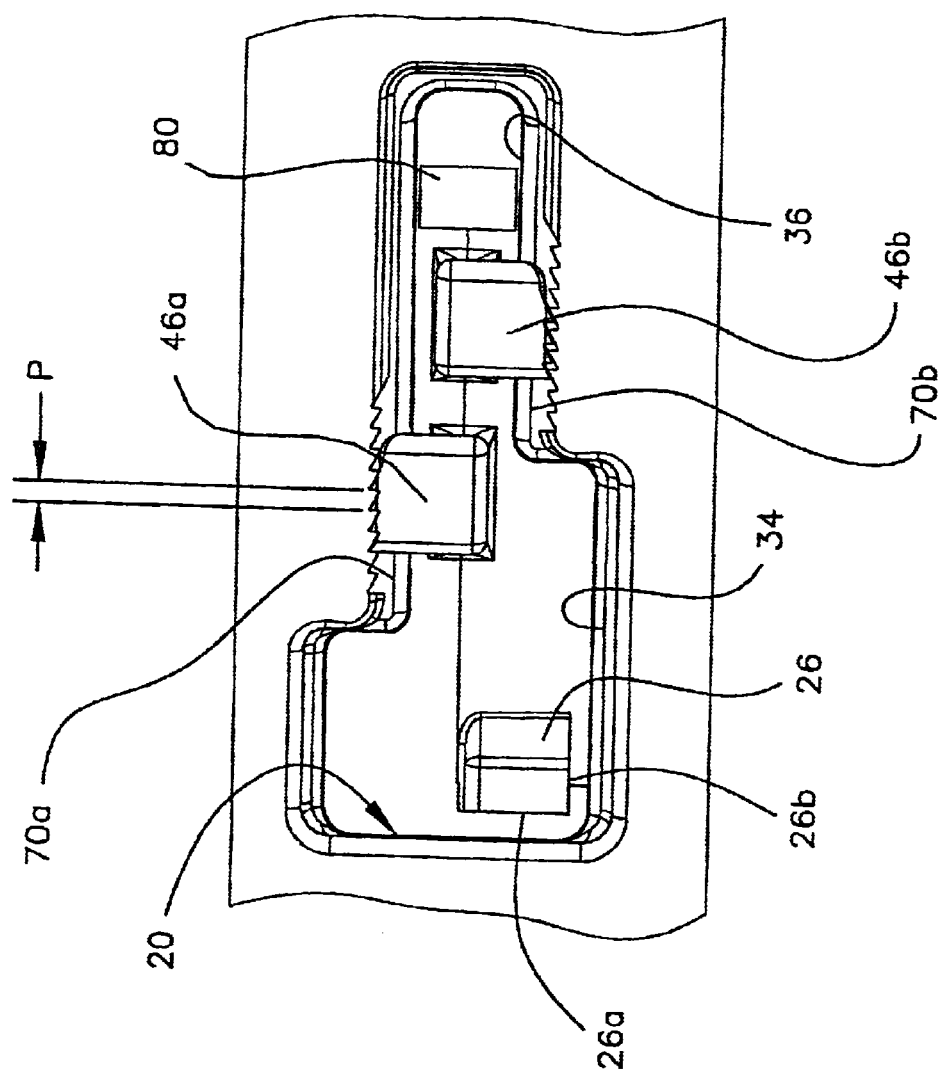

With reference to FIG. 5, the chain guide assembly 10 can further comprise a supplemental projection 80 that limits movement of the shoe 22 in a direction transverse to the chain travel direction 38. In the illustrated embodiment, the projection 80 is a block structure that extends from the inner surface 22b of the shoe 22 near the male connector 40 so that the projection 80 is tightly located in the restricted portion 36 of the keyhole aperture 20 when the shoe 22 is in the second, operative position. In the illustrated example shown in FIG. 5, the projection 80 is located between the leg 42b and the trailing end 22d of the shoe 22, i.e., downstream relative to the leg 22b.

Those of ordinary skill in the art will recognize that it is within the scope and intent of the present invention to provide more or less than the illustrated two mating pairs (48a,60a; 48b,60b) of saw-tooth fixing elements. For example, it is contemplated that the first saw-tooth fixing element of the bracket 12 and the second saw-tooth fixing element of the shoe 22 each be defined by three (or more) saw-tooth faces. In this case, the teeth of the three faces of either the first saw-tooth fixing element or the teeth of the three faces of the second saw-tooth fixing element would preferably be nominally offset from each other according to the P/n formula, where P=the pitch of the teeth and n=3. Also, the one or more pairs of saw-tooth fixing elements (48a,60a; 48b,60b) can be located in positions other than those illustrated without departing from the present invention, as long as the plastic shoe 22 includes at least one second saw-tooth fixing element that engages at least one first saw-tooth fixing element defined by or otherwise provided as a part of the bracket 12.

Modifications and alterations may occur to those of ordinary skill in the art upon reading this specification. It is

Having thus described the preferred embodiments, what is claimed is:

1. A chain guide comprising:
a bracket adapted for being secured to an associated engine, said bracket comprising a support surface including a leading end and a trailing end, and further comprising a first saw-tooth fixing element;
a guide shoe comprising: (i) a shoe leading end; (ii) a shoe trailing end spaced from said shoe leading end in a chain movement direction; (iii) a chain guide surface extending between said shoe leading end and said shoe trailing end and adapted for slidably supporting an associated chain moving in said chain movement direction; and, (iv) an inner surface positioned adjacent said support surface of said bracket, said guide shoe further comprising a second saw-tooth fixing element that mates with said first saw-tooth fixing element of said bracket to inhibit disconnection of said guide shoe and said bracket.

2. The chain guide as set forth in claim 1, wherein said guide shoe comprises a plastic material.

3. The chain guide as set forth in claim 1, wherein said guide shoe is selectively movable slidably on said support surface in said chain movement direction from a first position where said guide shoe is separable from said bracket to a second position where said guide shoe is fixedly secured to said bracket, wherein said first and second saw-tooth fixing elements cooperate with each other to inhibit movement of said guide shoe from said second position to said first position.

4. The chain guide as set forth in claim 1, wherein said first and second saw-tooth fixing elements each comprise a plurality of saw-teeth, wherein said teeth of said first saw-tooth fixing element are raked in a first direction that is opposite a second direction in which said teeth of said second saw-tooth fixing element are raked.

5. The chain guide as set forth in claim 3, wherein said shoe leading end comprises a hooked portion that receives said leading end of said support surface when said guide shoe is positioned in said second position.

6. The chain guide as set forth in claim 3, wherein said bracket leading end defines an open notch, and wherein said guide shoe comprises a rib that is received in said open notch when said guide shoe is located in said second position.

7. The chain guide as set forth in claim 3, wherein:
said guide shoe comprises a male connector projecting outwardly from said inner surface, wherein said second saw-tooth fixing element is located on said male connector; and,
said support surface of said bracket defines an opening that receives said male connector when said guide shoe is located in said second position.

8. The chain guide as set forth in claim 7, wherein said opening defined in said support surface is a keyhole opening comprising a wide portion and a narrow portion, said narrow portion located downstream from said wide portion and capturing said male connector when said guide shoe is located in said second position.

9. The chain guide as set forth in claim 7, wherein said male connector comprises first and second legs, and wherein said second saw-tooth fixing element comprises first and second saw-tooth faces located respectively on said first and second legs, said first and second saw-tooth faces arranged to face outwardly away from each other in opposite directions.

10. The chain guide as set forth in claim 9, wherein said first saw-tooth fixing element comprises a plurality of saw-teeth located at least on opposite sides of said opening and adapted to engage said first and second saw-tooth faces of said second saw-tooth fixing element.

11. The chain guide as set forth in claim 9, wherein said first and second legs are offset from each other in said chain movement direction.

12. The chain guide as set forth in claim 9, wherein said first and second legs are L-shaped and include respective first and second feet portions, and wherein said support surface defines first and second shoulders adjacent said opening, said first and second feet engaging said first and second shoulders when said guide shoe is located in said second position.

13. The chain guide as set forth in claim 9, wherein said first and second legs are resiliently movable in directions transverse to said chain movement direction.

14. The chain guide as set forth in claim 7, wherein said guide shoe further comprises a nib that projects outwardly from said inner surface, said nib located to extend through said opening when said guide shoe is moved to said second position and inhibit movement of said guide shoe from said second position to said first position.

15. The chain guide as set forth in claim 8, further comprising a supplemental projection extending outwardly from said inner surface adjacent said male connector, said supplement projection positioned in said narrow portion of said keyhole opening to inhibit movement of said guide shoe in directions transverse to said chain movement direction when said guide shoe is located in said second position.

16. The chain guide as set forth in claim 7, wherein said first saw-tooth fixing element is located adjacent said narrow portion of said keyhole opening.

17. The chain guide as set forth in claim 1, wherein said first saw-tooth fixing element is defined by "n" separate tooth faces each having teeth arranged at a pitch spacing "P", said second saw-tooth fixing element is defined by "n" separate tooth faces each having teeth arranged at the pitch spacing "P", and wherein the teeth defining one of the "n" tooth faces of the first saw-tooth fixing element are offset relative to the teeth defining the other tooth faces of the first saw-tooth fixing element in the chain movement direction by a distance P/n, or the teeth defining one of the "n" tooth faces of the second saw-tooth fixing element are offset relative to the teeth defining the other tooth faces of the second saw-tooth fixing element in the chain movement direction by a distance equal to P/n.

18. A chain guide comprising:
a bracket adapted for being secured to an associated engine, said bracket comprising a support, a bracket leading end and a bracket trailing end spaced from said leading end in a chain movement direction, said bracket further comprising a first saw-tooth fixing element defined by a plurality of teeth that extend in said chain movement direction and that are raked in said chain movement direction;
a plastic guide shoe comprising a shoe leading end, a shoe trailing end, a chain guide surface adapted for slidably supporting an associated chain moving in said chain movement direction, and an inner surface positioned adjacent said support of said bracket, said guide shoe selectively movable slidably relative to said support of said bracket between a first position where said guide shoe is separable from said bracket and a second position where said guide shoe is fixedly secured to said bracket, said guide shoe comprising: (i) a portion defined at said shoe leading end that that engages a portion of said bracket when said shoe is located in said second position; and, (ii) a second saw-tooth fixing element that mates with said first saw-tooth fixing element when said guide shoe is located in said second position, said second saw-tooth fixing element defined by a plurality of teeth that extend in said chain movement direction and that are raked in a direction opposite said chain movement direction.

19. The chain guide as set forth in claim 18, wherein said bracket defines an opening in said support and wherein said guide shoe further comprises a male connector projecting outwardly from said inner surface that is received in said opening when said guide shoe is in said first position, said male connector engaging said bracket and preventing separation of guide shoe inner surface from the support surface of the bracket when said guide shoe is located in said second position.

20. The chain guide as set forth in claim 19, wherein said second saw-tooth fixing element is located on said male connector.

* * * * *